United States Patent [19]

Mascia

[11] 4,203,006
[45] May 13, 1980

[54] DIRECT ACCESS COUPLER

[75] Inventor: Ray C. Mascia, Los Altos, Calif.

[73] Assignee: Prentice Corporation, Palo Alto, Calif.

[21] Appl. No.: 898,310

[22] Filed: Apr. 20, 1978

[51] Int. Cl.² ............................................. H04M 11/00
[52] U.S. Cl. .................................... 179/2 C; 179/81 R
[58] Field of Search ................... 179/1 C, 2 C, 16 A, 179/16 AA, 81 R, 99

[56] References Cited

U.S. PATENT DOCUMENTS

| | | | |
|---|---|---|---|
| 3,251,951 | 5/1966 | Meewezen | 179/81 R |
| 3,789,803 | 2/1974 | Davis et al. | 179/81 R |
| 3,906,167 | 9/1975 | Baker | 179/81 R |
| 3,913,071 | 10/1975 | Garofalo, Jr. | 179/2 DP |
| 3,925,624 | 12/1975 | Earle et al. | 179/81 R |
| 3,965,306 | 6/1976 | Watkins | 179/81 R |
| 3,988,549 | 10/1976 | Merlin et al. | 179/2 DP |
| 4,004,106 | 1/1977 | Yachabach et al. | 179/99 |
| 4,037,120 | 7/1977 | Colardelle et al. | 179/16 AA |
| 4,068,282 | 1/1978 | Rigollet | 179/1 C |

Primary Examiner—Bernard Konick
Assistant Examiner—Joseph A. Popek
Attorney, Agent, or Firm—Claude A. S. Hamrick

[57] ABSTRACT

A direct access coupler for connecting a piece of terminal equipment, such as a modem to a telephone line pair, the coupler being of reduced size achieved in part by the use of a miniaturized isolation transformer and a constant current circuit to divert the off-hook current which would otherwise flow through the isolation transformer or a current-shunting choke and by the use of both an optical isolator off-hook circuit and an optical isolator ring detector circuit.

12 Claims, 3 Drawing Figures

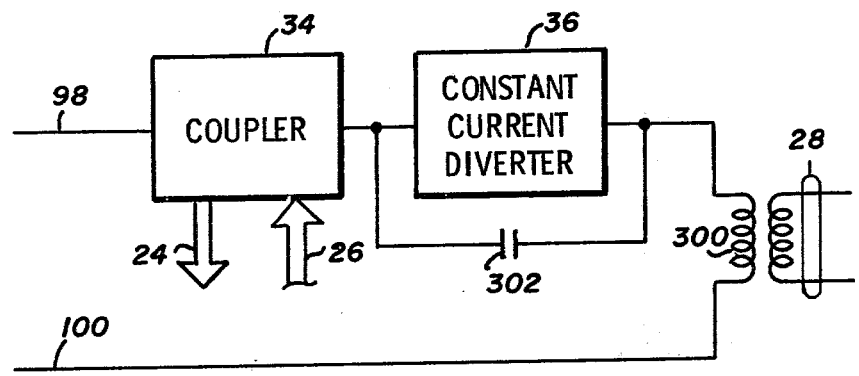
Fig_2
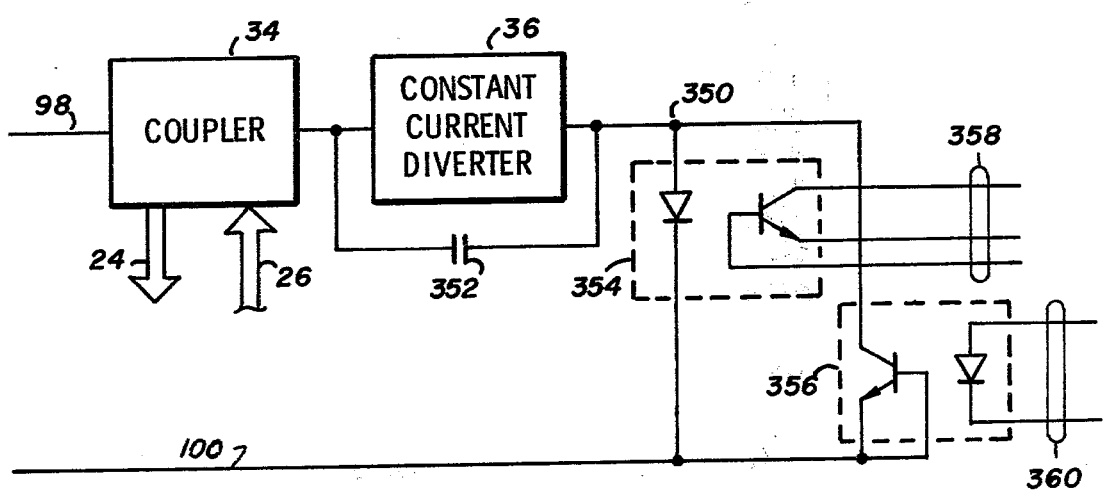
Fig_3

DIRECT ACCESS COUPLER

BACKGROUND OF THE INVENTION

1. Field of the Invention

The present invention relates generally to telephone accessories and more particularly to a miniaturized direct access coupler for connecting a piece of terminal equipment to a telephone line pair.

2. Description of the Prior Art

A recent Federal Communication Commission (FCC) ruling permits the use of direct access couplers approved pursuant to FCC Ruling Part 68 for use in coupling terminal equipment to the telephone network. Typically, approved prior art couplers include a ring detection relay having a coil which is connected by a DC blocking capacitor and a current limiting resistor to a plug for connection to the tip and ring line of the telephone line pair. The relay is adapted to respond to the 40 to 150 volt RMS 16 to 68 Hertz ring signal developed between the telephone line pair and to energize an associated set of relay contacts which may be used by the associated terminal equipment to recognize a call.

The coupler further includes an off-hook relay having a coil energized by the terminal equipment and having contacts which connect the plug to the primary winding of an isolating transformer, the secondary winding of which may be connected to the terminal equipment to couple AC signals between the telephone line pair and the equipment. When the off-hook relay contacts are closed, the primary winding of the isolation transformer additionally provides a path for current induced to flow by the 42.5 to 52.5 volt DC potential normally developed between the telephone line pair to power associated telephone devices and to notify the telephone company of the off-hook state.

Although this current need not exceed 20 milliamps in order to apprise the telephone company, it is possible for currents approaching 120 milliamps to flow through the primary winding of the primary transformer. It is no doubt apparent that a transformer suitable for sinking this level of DC current while providing coupling for AC signals at a distortion level required for reliable data transmission is relatively large.

In order to reduce this current-caused distortion and also the size of the isolation transformer, some prior art direct access couplers incorporate a DC blocking capacitor connected in series with the transformer and a parallel connected choke connected so as to shunt the off-hook current. Although reducing the distortion and permitting the use of a smaller transformer, the choke is itself relatively large.

In addition to the obvious advantages of incorporating the direct access coupler within the associated terminal equipment (preferably directly upon one of the printed circuit boards) such incorporation may also avoid the need for duplicate circuitry. In particular, where foreign equipment may be connected to a stand-alone coupler, the FCC requires level control circuitry within the coupler designed to insure that signals coupled to the telephone line pair do not exceed maximum signal levels, even though such circuitry may already be incorporated within the terminal equipment.

Finally, direct access couplers are required to withstand certain potentials in excess of the 264.5-volt peak potential developed by the combination of the DC potential and the ring signal. Specifically, the FCC requires that the controller withstand an 800-volt peak potential developed between the tip and ring lines in order to provide a degree of protection in the event that lightning should strike the telephone line pair, and a 1000-volt RMS potential developed between the telephone line pair and other points.

SUMMARY OF THE PRESENT INVENTION

It is therefore an object of the present invention to provide a low distortion, direct access coupler of compact configuration suitable for incorporation upon a printed circuit board of an associated piece of terminal equipment.

Briefly, the preferred embodiment of the present invention includes a voltage-dependent resistor, or varistor, series connected by a pair of current limiting resistors across the plug for connection to the tip and ring line of the telephone line pair for providing a degree of overvoltage protection, an optical isolator connected by a bridge rectifier, a current limiting resistor, and a DC blocking capacitor across the varistor for providing ring detection, a second bridge rectifier connected across the varistor for providing signal steering, an optical-isolator controlled transistorized off-hook circuit and a DC blocking capacitor for connecting an isolation transformer to the output of the second rectifier for coupling AC signals between the telephone line pair and an associated piece of terminal equipment and a transistorized constant current circuit connected by the off-hook circuit to the second rectifier for diverting the off-hook circuit to the second rectifier for diverting the off-hook current around the isolation transformer.

The compact size of the present invention made possible by the use of electronic circuits is thus a material advantage thereof.

The reduced distortion achieved with the present invention is another advantage thereof.

IN THE DRAWING

FIG. 2 is a diagram schematically illustrating an alternative embodiment of the direct access coupler in accordance with the present invention; and FIG. 3 is a diagram schematically illustrating another embodiment of the direct access coupler in accordance with the present invention.

DETAILED DESCRIPTION OF THE PREFERRED EMBODIMENT

Figure 1:
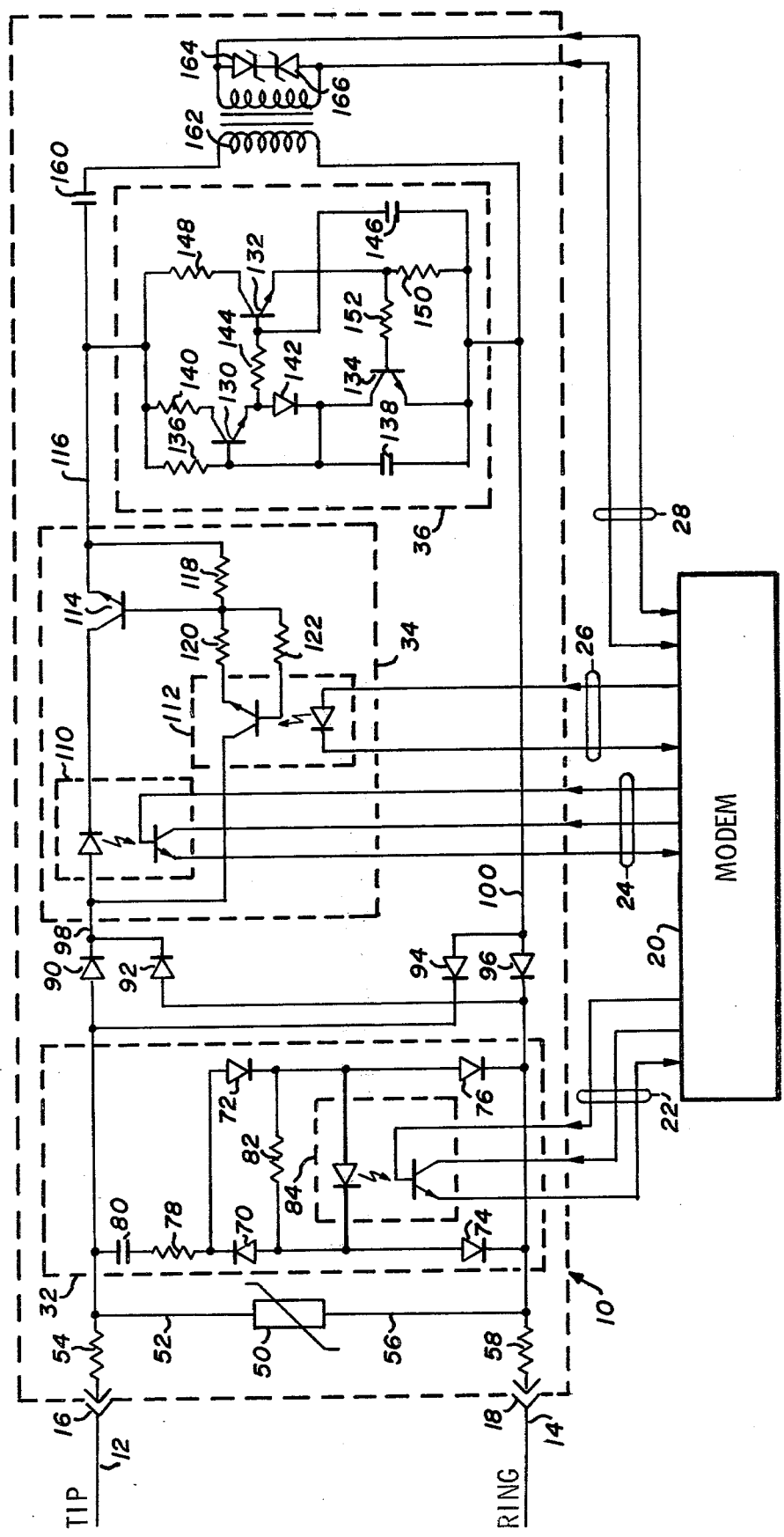
FIG. 1 is a schematic diagram illustrating the principal components of the preferred embodiment of the direct access coupler in accordance with the present invention.

With reference to the drawing, a direct access coupler in accordance with the present invention is generally designated by the number 10. The coupler is illustrated as it is connected to a line 12 designated the tip line and a line 14 designated the ring line of the telephone line pair by a pair of connectors 16 and 18, respectively. The coupler is further illustrated connected to a piece of terminal equipment 20 which for convenience is shown as a modem, although it is understood that other appropriate devices may also be utilized with the coupler. Cables interconnecting the coupler and the modem include a cable 22 for providing ring signal detected signals to the modem, a cable 24 for indicating to the modem a discontinuity in the on-hook/off-hook state of the coupler and a cable 28 for coupling AC signals between the modem and the telephone line pair by way of the coupler.

For convenience of discussion, the direct access coupler may be divided into major operative portions including an overvoltage protection portion, a ring detection portion 32, an off-hook coupling portion 34, a constant current diverting or current source portion 36 and a transformer portion. The overvoltage protection portion includes a voltage variable resistor, or varistor, 50 such as the MOV-varistor designated V240LA2 by the General Electric Company. Alternatively, a gas-tube type surge arrester may be employed. The varistor has a first terminal connected to a line 52 which is connected by a current-limiting resistor 54 to connector 16 and another terminal connected to a line 56 which is connected by another current-limiting resistor 58 to connector 18.

Although effective in dissipating the majority of the energy contained in many overvoltage transients, the rise time of varistor 50 is such that it is unable to completely absorb 800-volt transients having a 10 microsecond or less rise time as required by the FCC Ruling Part 68. Thus, it is necessary that the rest of the coupler be able to withstand the remainder of this type of transient.

The ring detection portion of the direct access coupler includes a bridge rectifier having four diodes including diodes 70, 72, 74 and 76. A first input of the bridge rectifier is connected to line 56, and a second input is connected by a current-limiting resistor 78 and a DC blocking capacitor 80 to line 52. The outputs of the bridge rectifier are connected across both a shunting resistor 82 and the diode portion of an optical-isolator 84, the transistor portion of which is connected to bus 22. Capacitor 80 is preferably a self-healing metalized mylar-type capacitor, and optical-isolator 84 id a device such as that designated H11A2 by the General Electric Company, suitable for withstanding the 1000-volt RMS potential.

AC ring signals developed across the telephone line pair are coupled by capacitor 80 and resistor 78 to the diode bridge which steers the signals to develop rectified signals suitable for driving the diode portion of the optical isolator. Responsive to the driving signals, the optical-isolator develops signals on bus 22 which are isolated from the telephone line pair. Capacitor 80 and resistor 78 provide the required impedance to the DC and the AC signals respectively, developed across the telephone line pair and resistor 82 shunts a portion of the optical-isolator to provide the degree of sensitivity required.

Since the polarity of the DC voltage developed between the telephone line pair may vary, a second diode bridge including diodes 90, 92, 94 and 96 are connected so as to steer the signals developed between lines 52 and 56 and a pair of lines 98 and 100 such that a positive signal is developed on line 98 with respect to line 100.

The principal active components of the off-hook coupling portion of the direct access coupler include a pair of optical-isolators 110 and 112, and a transistor 114. Transistor 114 has a collector which is connected by the diode portion of optical-isolator 110 to line 98 and an emitter which is connected to a line 116. The transistor further has a base which is connected to line 116 by a base pull-down, or biasing, resistor 118, to the emitter of the transistor portion of optical-isolator 112 by a current limiting resistor 120 and to the base of the transistor portion of optical-isolator 112 by an optical-isolator base pull-down resistor 122. The collector of the transistor portion of optical-isolator 112 is connected to line 98, and the diode portion of the same optical-isolator is connected to bus 26.

Responsive to the light-emitting diode driving signal developed by the modem on buss 26, optical isolator 112 is operative to bias transistor 114 into its active region coupling the signals developed on line 98 to line 116.

As will shortly be explained, when transistor 114 is conductive, a DC current of approximately 20 milliamps flows through the transistor and thus through the diode portion of optical-isolator 110. Responsive to this current, the optical-isolator develops isolated signals on bus 24 which may be used by the modem to sense an interruption in the off-hook current such as will occur when the party on the other end of the telephone line pair hangs up.

The principal active components of the constant current portion of the direct access coupler includes three transistors 130, 132 and 134. Transistor 130 has a base which is connected to line 116 by a biasing resistor 136 and to line 100 by a filtering and clamping capacitor 138. The transistor additionally has a collector which is connected to line 116 by a current limiting resistor 140 and an emitter which is connected to its base by a clamping diode 142.

Transistor 132 has a base which is connected to the emitter of transistor 130 by a current-limiting resistor 114 and to line 100 by a clamping capacitor 146, a collector which is connected to line 116 by a current-limiting resistor 148 and an emitter which is connected to line 100 by a biasing resistor 150. Transistor 134 has a base which is connected to the emitter of transistor 132 by a current-limiting resistor 152, a collector which is connected to the base of transistor 130, and an emitter which is connected to line 100.

When the off-hook coupling portion of the direct access coupler is operative to couple signals developed on line 98 to line 116, the constant current portion of the coupler is operative to conduct a current of 20 milliamperes between line 116 and line 100 as required in order to notify the telephone company of the off-hook condition. More specifically, a positive potential developed on line 116 causes a base current to flow through resistor 136 and into the base of transistor 130. Responsive to this base current transistor 130 develops an amplified current which flows into the base of transistor 132. As a result, transistor 132 develops a further amplified current which is caused to flow through resistor 150 to develop a control signal thereacross. When the level of this control signal exceeds a few tenths of a volt, biasing transistor 134 on, transistor 134 diverts a portion of the current which would otherwise flow through resistor 136 and into transistor 130. In this fashion, the potential developed across resistor 150 and thus the current therethrough is maintained at a predetermined level, in this case 20 milliamps.

Capacitor 138 is operative to filter the bias current flowing through resistor 136 such that the constant current portion of the coupler will not respond to AC signals developed between lines 116 and 100. In this way, a high AC impedance is maintained between line 116 and line 100, which impedance is substantially the algebretic sum of the impedances of resistor 136 and capacitor 138.

Coupled between lines 116 and 100 by a DC blocking capacitor 160 is the primary winding of an isolation transformer 162. The secondary winding of the transformer is connected to bus 28 and across a pair of back-to-back connected zener diodes 164 and 166. Capacitor 160 is preferably of the self-healing metalized mylar-type, and transformer 162 is of the miniaturized-type used where no direct current will flow through its windings.

Reviewing the normal operation of the direct access coupler, in the on-hook state, suitable potentials (zero volts) are developed on bus 26 by modem 20 to turn the transistor portion of optical-isolator 112 off, thus biasing transistor 114 off. When ring signals are developed on the telephone line pair, they are rectified by the diode bridge to develop optical-isolator driving signals across optical-isolator 84. In response, the optical-isolator develops isolated signals on bus 22 for use by modem 20.

In response to the isolated ring-detected signals developed on bus 22 or in order to initiate a call, modem 20 develops a light-emitting diode driving current on bus 26 which causes conduction of the transistor portion of optical-isolator 112 and thus, causes the conduction of transistor 114. While transistor 114 is conductive, transistors 130, 132 and 134 cause 20 milliamps of current to flow between line 116 and line 100 notifying the telephone company of the off-hook condition. Also, while transistor 114 is conducting, AC signals are coupled between the telephone line pair and bus 28 by isolation transformer 162.

When the calling party hangs up, the current flow through the diode portion of optical-isolator 110 is interrupted and the optical-isolator develops suitable isolated response signals on bus 24 to drive modem 20.

As previously indicated, a majority of the energy of all but the fastest transients is absorbed by varistor 50 and resistors 54 and 58. Should a fast transient occur while transistor 114 is off, a potential may be developed between lines 98 and 100 sufficient to break down the transistor portion of optical-isolator 112 and which will thus bias transistor 114 on. During this time resistor 120 will limit the current flow through the optical-isolator and into the base of transistor 114 to protect both devices.

Although capacitor 138 will clamp, or filter, the portion of the transient developed at the base of transistor 130, the portion of the transient developed at the collector of transistor 130 may be sufficient to cause break down of this transistor. In this case, resistors 140 and 144 will limit the current to a safe level, and diode 142 will clamp the reverse potential developed between the emitter and base of transistor 130 to protect the transistor.

Additionally, capacitors 138 and 146 will filter the transient such that although it may bias transistor 132 on, it will not cause saturation of the transistor. Finally, resistor 148 limits the current flowing into the collector of transistor 132 to a safe level, and resistor 152 limits the current flowing into the base of transistor 134 to a safe level. It will thus be seen that the circuit absorbs the excess energy of the transient without harm, and since transistor 132 will not saturate, it will again limit the off-hook current to 20 milliamperes following the initial portion of the transient.

Zener diodes 164 and 166 are operative to limit the magnitude of the transient coupled by isolation transformer 162 to bus 28.

Turning now to FIG. 2, a portion of a direct access coupler is shown illustrating an alternative embodiment of the present invention. In this embodiment the off-hook coupling portion 34 and the constant current diverting portion 36 of the previous embodiment and the primary winding of an isolation transformer 300 are all connected in series between lines 98 and 100. The secondary winding of transformer 300 is connected to cable 28. In addition, an AC signal bypassing capacitor 302 is connected in parallel with the constant current diverter portion to provide a path for AC signals around the diverter.

In this embodiment the 20 milliamps of off-hook current are caused to flow through the primary winding of transformer 300. As a consequence, transformer 300 will necessarily be larger than some of the transformers which will operate in the previous embodiment, however, transformer 300 need not be capable of sinking the much larger currents which would flow through its primary winding in the absence of the constant current diverting portion.

A portion of an alternative embodiment employing optical-isolator circuits in place of the isolation transformer is illustrated in FIG. 3. In this embodiment the off-hook coupling portion 34 and the constant current diverting portion 36, of the embodiment illustrated in FIG. 1, are connected in series between line 98 and a node 350, and an AC signal bypassing capacitor 352 is connected in parallel with the constant current diverting portion. Connected between node 350 and line 100 are a pair of linear optical-isolator circuits as suggested by the blocks 354 and 356. Optical-isolator circuit 354 is operative to couple the AC signal which is developed between node 350 and line 100 (and thus the tip and ring line of the telephone line pair when the off-hook state) to a cable 358 for routing to the associated piece of terminal equipment. Optical-isolator circuit 356 is operative to couple AC signals developed on a cable 360 by the terminal equipment to the telephone line pair. The optical-isolator circuits are illustrated in the more general configuration where they are connected to separate cables, however they may also be connected to a common cable.

At this point it should be apparent that the optical-isolator circuits and the constant current diverting portion may be connected in several different configurations. In fact, whether either or both of the optical-isolator circuits are connected in series with or parallel with the diverter will primarily depend upon the bias current requirements and the impedance of the optical-isolator circuits.

It should therefore be obvious that after having read the preceding disclosure certain other alteration and modifications of the present invention will no doubt become apparent to those skilled in the art. It is therefore intended that the following claims be interpreted to cover all such alterations and modifications as fall within the true spirit and scope of this invention.

What is claimed is:

1. A direct access coupler capable of withstanding lightning surge transients comprising:
   isolation transformer means including a primary winding having a first end and a second end, and a secondary winding;
   first capacitor means including a first end which is connected to said first end of said primary winding and a second end;
   current source means including
      an input lead connected to said second end of said first capacitor means,
      an output lead connected to said second end of said primary winding, second capacitor means having a first end connected to said output lead and a second end, first resistor means having a first end connected to said second end of said second capacitor means and a second end connected to said input lead, said first resistor for developing a bias current, second resistor means having a first end connected to said input lead, and a second end, first transistor means having a base connected to said first end of said first resistor for receiving at least a portion of said bias current, a collector coupled to said second end of said second resistor means, and an emitter for developing an amplified bias current, third resistor means having a first end connected to said output lead and a second end, fourth resistor means having a first end connected to said input lead, and a second end, fifth resistor means having a first end connected to the emitter of said first transistor means, and a second end, second transistor means having a base coupled to said second end of said fifth resistor means, a collector coupled to said second end of said fourth resistor means, and an emitter connected to said second end of said third resistor means, said second transistor means for causing said off-hook current to flow through said third resistor means, sixth resistor means having a first end connected to the emitter of said second transistor means, and a second end, diode means having an anode connected to said emitter of said first transistor means, and a cathode, third transistor means having a base coupled to said second end of said sixth resistor means, an emitter connected to said output lead and a collector connected to said cathode and to said first end of said first resistor means, said third transistor means being responsive to the level of the potential developed across said third resistor means by said off-hook current and operative to divert a portion of said bias current to maintain said off-hook current at a predetermined magnitude, and third capacitor means having a first end connected to said output lead, and a second end connected to the base of said second transistor means, said second and fifth resistor means and said diode means being operative to provide transient energy protection for said first transistor means, said second and third capacitor means being operative to prevent transient energy from driving said second transistor means into saturation, said fourth resistor means being operative to limit said off-hook current, and said sixth resistor means being operative to limit the base current to said third transistor means to a safe level;

a first terminal and a second terminal for connection across a telephone line pair;

first circuit means for coupling signals between said first terminal and said output lead of said current source means; and second circuit means for coupling signals between said second terminal and said input lead of said current source means, said second circuit means including switching means having an on-hook state wherein said switching means is nonconductive and an off-hook state wherein said switching means is conductive, said switching means being responsive to a control signal and operative to change from said on-hook state to said off-hook state, whereby an off-hook current of said predetermined magnitude which is voltage independent and of a value at least large enough to apprise the telephone company of the off-hook state of said switching means is conducted through said current source means, whereby AC signals are coupled between said first and second terminals and said primary winding, and whereby DC signals are blocked from flowing into said primary winding by said first capacitor means.

2. A direct access coupler as recited in claim 1 wherein said first circuit means includes means for coupling signals between said first terminal and a first node, and means for coupling signals between said first node and said output lead of said current source means; wherein said second circuit means includes means for coupling signals between said second terminal and a second node, and means including said switching means for coupling signals between said second node and said input lead of said current source means; and wherein said coupler further comprises ring detection means connected between said first and said second nodes, said ring detection means being responsive to a ring signal developed between said first and second terminals and operative to develop a ring detected signal.

3. A direct access coupler as recited in claim 2 wherein said ring detection means includes:

fourth capacitor means having a first end connected to said first node and a second end;

seventh resistor means having a first end connected to said second end of said fourth capacitor means and a second end;

bridge rectifier means having a first input connected to said second end of said seventh resistor means, a second input connected to said second node, a first output and a second output; and optical-isolator means having a first input connected to said first output of said bridge rectifier means, a second input connected to said second output of said bridge rectifier means and at least one output, whereby said ring signal is coupled by said fourth capacitor means, is current limited by said seventh resistor means, is rectified by said bridge rectifier means, and is isolated by said optical-isolator means to develop said ring detected signal at said output of said optical-isolator.

4. A direct access coupler as recited in claim 1 wherein said first circuit means includes means including seventh resistor means having a first end connected to said first terminal and a second end connected to a first node, and means for coupling signals between said first node and said output lead of said constant current means; wherein said second circuit means includes means including eighth resistor means having a first end connected to said second terminal and a second end connected to a second node, and means including said switching means for coupling signals between said second node and said input lead of said current source means; and wherein said coupler further includes varistor means having a first end connected to said first node and a second end connected to said second node, said varistor means having a resistance which decreases in value as the applied voltage increases, whereby when a transient having a level in excess of a predetermined level is developed between said first and second terminals, said varistor means is operative to conduct and dissipate a portion of the energy of the transient in said varistor means and said seventh and eighth resistor means.

5. A direct access coupler as recited in claim 1 wherein said first circuit means includes diode means operative to couple signals of a first polarity between said first terminal and said output lead of said current source means and operative to couple signals of said first polarity between said second terminal and said output lead of said current means, wherein said second circuit means includes diode means operative to couple signals of the polarity opposite said first polarity between said second terminal and a first node, and operative to couple signals of said opposite polarity between said first terminal and said first node, and wherein said switching means includes:
 fourth transistor means having an emitter connected to said input lead of said current source means, a collector which is coupled to said first node, and a base;
 seventh resistor means having a first end which is connected to said base and a second end which is connected to said emitter of said fourth transistor means; and
 first optical-isolator means having at least one input, a first output which is connected to said first node and a second output which is connected to said base,
 whereby when said control signal is developed at said input to said first optical-isolator means, said first optical-isolator means is operative to bias said fourth transistor means so as to cause conduction of said fourth transistor means changing said switching means from said on-hook state to said off-hook state.

6. A direct access coupler as recited in claim 5 wherein said switching means further includes second optical-isolator means having a first input which is connected to said first node, a second input which is connected to said collector of said fourth transistor means, and at least one output, said second optical-isolator means being responsive to said off-hook current and operative to develop an off-hook current detected signal at said output of said second optical-isolator means.

7. A direct access coupler as recited in claim 18 and further comprising:
 modem means coupled to said switching means and said secondary winding, said modem means for generating said control signal, for converting said AC signals to first digital signals and for converting second digital signals into AC signals across said secondary windings.

8. A direct access coupler as recited in claim 7 wherein said first circuit means includes means for coupling signals between said first terminal and a first node, and means for coupling signals between said first node and said output lead of said current source means; wherein said second circuit means includes means for coupling signals between said second terminal and a second node, and means including said switching means for coupling signals between said second node and said first input lead of said surrent source means; and wherein said coupler further comprises ring detection means connected between said first and said second nodes and coupled to said modem, said ring detection means being responsive to a ring signal developed between said pair of terminals and operative to develop a ring detected signal which is coupled to said modem.

9. A direct access coupler as recited in claim 8 wherein said ring detection means includes:
 fourth capacitor means having a first end connected to said first node and a second end;
 seventh resistor means having a first end connected to said second end of said fourth capacitor means and a second end;
 bridge rectifier means having a first input connected to said second end of said seventh resistor means, a second input connected to said second node, a first output and a second output; and
 optical-isolator means having a first input connected to said first output of said bridge rectifier means, a second input connected to said second output of said bridge rectifier means and at least one output connected to said modem,
 whereby said ring signal is coupled by said fourth capacitor means, current limited by said seventh resistor means, rectifier by said bridge rectifier means and isolated by said optical-isolator means to develop said ring detected signal.

10. A direct access coupler as recited in claim 7 wherein said first circuit means includes means including seventh resistor means having a first end connected to said first terminal and a second end connected to a first node, and means for coupling signals between said first node and said output lead of said current source means; wherein said second circuit means includes means including eighth resistor means having a first end connected to said second terminal and a second end connected to a second node, and means including said switching means for coupling signals between said second node and said input lead of said current source means; and wherein said coupler further includes varistor means having a first end connected to said first node and a second end connected to said second node, said varistor means having a resistance which decreases in value as the applied voltage increases, whereby when a transient having a level in excess of a predetermined level is developed between said first and second terminals, said varistor means is operative to conduct and dissipate a portion of the energy of the transient in said varistor means and said seventh and eighth resistor means.

11. A direct access coupler as recited in claim 7 wherein said first circuit means includes diode means operative to couple signals of a first polarity between said first terminal and said output lead of said current source means and operative to couple signals of said first polarity between said second terminal and said output lead of said current source means, wherein said second circuit means includes diode means operative to couple signals of the polarity opposite said first polarity between said second terminal and a first node, and operative to couple signals of said opposite polarity between said first terminal and said first node, and wherein said switching means includes:
 fourth transistor means having an emitter connected to said input lead of said current source means, a collector which is coupled to said first node, and a base;
 seventh resistor means having a first end which is connected to said base and a second end which is connected to said emitter of said fourth transistor means; and first optical-isolator means having at least one input, a first output which is connected to said first node and a second output which is connected to said base, whereby when said control signal is developed at said input to said first optical-isolator means, said first optical-isolator means is operative to bias said fourth transistor means so as to cause conduction of said fourth transistor means changing said switching means from said on-hook state to said off-hook state.

12. A direct access coupler as recited in claim 11 wherein said switching means further includes second optical-isolator means having a first input which is connected to said first node, a second input which is connected to said collector of said fourth transistor means and at least one output which is coupled to said modem, said second optical-isolator means being responsive to said off-hook current and operative to develop an off-hook current detected signal which is coupled to said modem.

* * * * *